United States Patent
Botti et al.

(10) Patent No.: US 10,233,266 B2
(45) Date of Patent: Mar. 19, 2019

(54) METHOD TO PREPARE RUBBER COMPOUNDS CONTAINING SILICON DIOXIDE FOR THE PRODUCTION OF TYRES

(71) Applicant: BRIDGESTONE CORPORATION, Tokyo (JP)

(72) Inventors: Francesco Botti, Rome (IT); Raffaele Di Ronza, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/557,247

(22) PCT Filed: Mar. 11, 2016

(86) PCT No.: PCT/IB2016/051407
§ 371 (c)(1),
(2) Date: Sep. 11, 2017

(87) PCT Pub. No.: WO2016/147089
PCT Pub. Date: Sep. 22, 2016

(65) Prior Publication Data
US 2018/0057615 A1    Mar. 1, 2018

(30) Foreign Application Priority Data
Mar. 13, 2015 (IT) ............... RM2015A0105

(51) Int. Cl.
| | | |
|---|---|---|
| C01B 39/02 | (2006.01) |
| C08C 19/25 | (2006.01) |
| C08K 3/36 | (2006.01) |
| C08K 5/548 | (2006.01) |
| C08K 9/02 | (2006.01) |
| B60C 1/00 | (2006.01) |
| C08C 19/26 | (2006.01) |
| C08J 3/24 | (2006.01) |
| C08K 3/34 | (2006.01) |
| C08L 9/00 | (2006.01) |

(52) U.S. Cl.
CPC ............ *C08C 19/25* (2013.01); *B60C 1/0016* (2013.01); *C08C 19/26* (2013.01); *C08J 3/242* (2013.01); *C08K 3/34* (2013.01); *C08K 3/36* (2013.01); *C08K 5/548* (2013.01); *C08K 9/02* (2013.01); *C08L 9/00* (2013.01); *B60C 1/00* (2013.01); *C01B 39/026* (2013.01); *C08K 3/346* (2013.01); *C08L 2666/58* (2013.01)

(58) Field of Classification Search
None
See application file for complete search history.

(56) References Cited

U.S. PATENT DOCUMENTS

| | | | | |
|---|---|---|---|---|
| 5,143,708 A | * | 9/1992 | Nakazawa | ............... A61K 8/25 252/572 |
| 5,389,357 A | * | 2/1995 | Sato | ...................... C01B 39/026 423/714 |
| 2004/0152811 A1 | | 8/2004 | Lin et al. | |

FOREIGN PATENT DOCUMENTS

WO    00/32684 A1    6/2000

OTHER PUBLICATIONS

International Search Report for PCT/IB2016/051407 dated Jul. 5, 2016 [PCT/ISA/210].
Written Opinion for PCT/IB2016/051407 dated Jul. 5, 2016 [PCT/ISA/237].

* cited by examiner

*Primary Examiner* — Richard A Huhn
(74) *Attorney, Agent, or Firm* — Sughrue Mion, PLLC

(57) ABSTRACT

A rubber compound containing silicon dioxide for the production of tires and comprising a polymer base with a cross-linkable unsaturated chain, a filler comprising silicon dioxide, a silane bonding agent and a vulcanization system. The filler further comprises a composite mineral consisting of a mineral of the zeolite family, onto which a layer of silicon dioxide has been deposited.

17 Claims, No Drawings

METHOD TO PREPARE RUBBER COMPOUNDS CONTAINING SILICON DIOXIDE FOR THE PRODUCTION OF TYRES

CROSS REFERENCE TO RELATED APPLICATIONS

This application is a National Stage of International Application No. PCT/IB2016/051407, filed on Mar. 11, 2016, which claims priority from Italian Patent Application No. RM2015A000105, filed on Mar. 13, 2015, the contents of all of which are incorporated herein by reference in their entirety.

TECHNICAL FIELD

The present invention concerns a method to prepare rubber compounds containing silicon dioxide for the production of tyres.

BACKGROUND ART

The use of silicon dioxide as a replacement for carbon black in tread compounds has been known for some time. In particular, silicon dioxide is used in combination with a silane bonding agent. The silane bonding agent has the function of interacting with the silanol groups of the silicon dioxide, thus inhibiting the formation of hydrogen bonds between its particles. The formation of the above-mentioned hydrogen bonds would necessarily produce the formation of agglomerates, resulting in irregular dispersion of the silicon dioxide in the polymer base. Furthermore, the silane bonding agent, if appropriately functionalized, can interact with the polymer base to create a chemical bridge between the latter and the silicon dioxide. Compared to carbon black, silicon dioxide gives the compound improved rolling resistance and improved road holding in wet conditions.

One of the objectives of tyre research is to improve rolling resistance without deteriorating, or compromising, the other characteristics. As is known to a person skilled in the art, rolling resistance is closely linked to tyre weight. A reduction in the weight of the compound can be obtained by a reduction in the quantity of silicon dioxide. This solution, although it necessarily entails a reduction in the weight of the compound, with consequent advantages in terms of rolling resistance, nevertheless also entails a deterioration in its mechanical characteristics, for example abrasion resistance.

The need was therefore felt for a solution able to reduce the weight of the compound, without deteriorating its mechanical characteristics.

The Applicant has unexpectedly found a solution that allows reduction of the weight of the compound while maintaining unchanged, or even improving, the mechanical characteristics thereof.

DISCLOSURE OF INVENTION

The subject of the present invention is a rubber compound containing silicon dioxide to produce tyres; said compound comprising a polymer base with a cross-linkable unsaturated chain, a filler comprising silicon dioxide, a silane bonding agent and a vulcanization system; said compound being characterised in that said filler comprises a composite mineral consisting of a mineral of the zeolite family onto which a layer of silicon dioxide has been deposited.

Here and below, by the term "polymer base with cross-linkable unsaturated chain" we mean any natural or synthetic non cross-linked polymer able to take on all the chemical-physical and mechanical characteristics typical of elastomers following cross-linking (vulcanization) with sulphur-based systems.

Here and below, by vulcanization system we mean a complex of ingredients comprising at least sulphur and accelerating products which, during preparation of the compound, are added in a final mixing phase and have the purpose of promoting vulcanization of the polymer base once the compound is subject to a vulcanization temperature.

Preferably, said filler comprises 50 to 95 phr and 5 to 50 phr of said composite mineral; more preferably, said filler comprises 70 to 90 phr of silicon dioxide and 10 to 30 phr of said composite mineral.

Preferably, said composite mineral consists of 85 to 95 parts by weight of zeolite and 5 to 15 parts by weight of silicon dioxide.

Preferably, said mineral of the zeolite family has a quantity of empty volume ranging from 15 to 50% of the total volume.

Preferably said composite mineral is produced by means of the following operations:
keeping said mineral of the zeolite family soaked in a silicon dioxide precursor in the liquid state;
adding said mineral of the zeolite family soaked in the silicon dioxide precursor to an organic solvent and keeping the resulting solution under agitation;
adding a catalyst to the solution for synthesis of the silicon dioxide;
precipitating a matrix of the mineral of the zeolite family comprising silicon dioxide by adding a precipitation agent;
separating and washing the matrix precipitated in the previous operation.

Preferably, said silicon dioxide precursor is comprised in the group consisting of tetraalkoxysilanes, polysulphur silanes, free mercaptosilanes and blocked mercaptosilanes.

Preferably, said silicon dioxide precursor is tetraethoxysilane.

Preferably, said catalyst for synthesis of the silicon dioxide is a basic catalyst.

Preferably, said silicon dioxide precursor is used in a quantity ranging from 150 to 350% by weight with respect to the mineral of the zeolite family.

A further subject of the present invention is a tyre portion produced with the compound subject of the present invention; preferably, this tyre portion is a tread.

A further subject of the present invention is a tyre comprising a portion produced with the compound subject of the present invention.

A further subject of the present invention is the use in rubber compounds for the production of tyres of a composite mineral consisting of a mineral of the zeolite family onto which a layer of silicon dioxide has been deposited.

BEST MODE FOR CARRYING OUT THE INVENTION

Some embodiment examples are given below for purely illustrative non-limiting purposes.

EXAMPLES

Three comparison compounds (A-C) and one compound (D) produced according to the present invention were prepared.

In particular, the comparison compound A represents a standard compound for treads; the comparison compound B differs from the compound A due to the fact that it has a smaller quantity of silicon dioxide; the comparison compound C differs from the compound B due to the fact that it comprises a mineral of the zeolite family without the surface silicon dioxide layer; the compound according to the invention D differs from the compound C due to the fact that the composite mineral is used instead of the simple mineral of the zeolite family.

The compounds of the examples were prepared following the procedure described below.

Preparation of the Compounds (First Mixing Step)

In a mixer with tangential rotors and internal volume ranging from 230 to 270 liters, the polymer base with cross-linking unsaturated chain, the silicon dioxide, the silane bonding agent and, when scheduled, the composite mineral or the mineral of the zeolite family were loaded before beginning the mixing, reaching a filling factor of 66-72%.

The mixer was operated at a speed of 40-60 r.p.m. and the mixture that formed was discharged once a temperature of 140-160° C. had been reached.

(Second Mixing Step)

The vulcanization system, the zinc oxide and the antioxidising agents were added to the mixture obtained from the first mixing step, reaching a filling factor of 63-67%.

The mixer was operated at a speed of 20-40 r.p.m. and the mixture that formed was discharged once a temperature of 100-110° C. had been reached.

Table I shows the compositions in phr of the compounds A-D.

TABLE I

|  | A | B | C | D |
|---|---|---|---|---|
| S-SBR |  | 80 |  |  |
| BR |  | 20 |  |  |
| Carbon black |  | 10 |  |  |
| Silicon dioxide | 80 | 70 | 70 | 70 |
| Zeolite | — | — | 20 | — |
| Composite mineral | — | — | — | 22 |
| Silane bonding agent | 8 | 7 | 7 | 7 |
| Stearic acid |  | 2 |  |  |
| Sulphur |  | 1.8 |  |  |
| ZnO |  | 1.7 |  |  |
| 6PPD |  | 1 |  |  |
| DPG |  | 1.2 |  |  |
| TBBS |  | 1.6 |  |  |
| MBTS |  | 0.8 |  |  |

S-SBR is a polymer base obtained via a process of polymerization in solution with a mean molecular weight of between $500 \times 10^3$ and $1500 \times 10^3$, with a styrene content between 20 and 45%.

BR stands for butadiene rubber.

The silicon dioxide used is marketed under the name VN3 by the company EVONIK and has a surface area of approximately 170 m²/g.

The silane bonding agent used has a formula $(CH_3CH_2O)_3Si(CH_2)_3SS(CH_2)_3Si(OCH_2CH_3)_3$ and is marketed under the name SI75 by the company EVONIK.

The zeolite used can be of either natural or synthetic origin.

6PPD is the abbreviation of N-(1,3-Dimethylbutyl)-N'-phenyl-p-phenylenediamine used as antioxidant.

DPG is the abbreviation of the product Diphenyl-guanidine used as a vulcanization accelerator.

The composite mineral was obtained via the procedure described below.

In particular, the procedure is the following:
- 250 g of tetraethoxysilane were deposited on 100 g of zeolite;
- the zeolite treated as above was suspended in 1.5 L of THF and the resulting suspension was kept under slow agitation for 24 hours;
- 5 g of n-hexylamine and 58 g of water were added to the suspension which was kept under agitation for 30 hours at ambient temperature;
- precipitation was induced by the addition of acetone;
- the precipitated zeolite matrix was subsequently separated and dried.

In this way the zeolite functionalized with silicon dioxide was obtained.

Each of the compounds reported in Table I was subjected to a specific gravity measurement and an abrasion resistance measurement, measured according to the DIN 53516 standard.

Table II shows the results obtained in terms of abrasion resistance and specific gravity. The values of Table II were indexed on the basis of the results obtained from the standard comparison compound A. In terms of abrasion resistance, the higher the value obtained, the better the corresponding property; in terms of specific gravity, the lower the value obtained, the better the corresponding property.

TABLE II

|  | A | B | C | D |
|---|---|---|---|---|
| Abrasion resistance | 100 | 90 | 70 | 100 |
| Specific gravity | 100 | 98 | 92 | 92 |

As can be seen from the data given in Table II, the compound produced according to the present invention has an improved resistance to abrasion together with a lower specific gravity which necessarily results in improved rolling resistance.

In other words, the inventors of the present invention have produced a solution able to replace part of the silicon dioxide present in the compound with a composite mineral, which has a lower density than that of the silicon dioxide but is structured so as to give the compound the same advantages as those obtained with the use of the silicon dioxide.

The invention claimed is:

1. A rubber compound containing silicon dioxide for the production of tyres; said compound comprising a polymer base with a cross-linkable unsaturated chain, a filler comprising silicon dioxide, a silane bonding agent, and a vulcanization system; wherein said filler comprises a composite mineral comprising a mineral of the zeolite family, onto which a layer of silicon dioxide has been deposited.

2. The rubber compound according to claim 1, wherein said filler comprises 50 to 95 phr of silicon dioxide and 5 to 50 phr of said composite mineral.

3. The rubber compound according to claim 2, wherein said filler comprises 70 to 90 phr of silicon dioxide and 10 to 30 phr of said composite mineral.

4. The rubber compound according to claim 1, wherein said composite mineral is made up of 85 to 95 parts by weight of zeolite and 5 to 15 parts by weight of silicon dioxide.

5. The rubber compound according to claim 1, wherein said mineral of the zeolite family has a quantity of empty volume ranging from 15 to 50% of the total volume.

6. The rubber compound according to claim 1, comprising 5 to 10 phr of silane bonding agent.

7. The rubber compound according to claim 1, wherein said composite mineral is realized by a sequence of the following operations:
keeping said mineral of the zeolite family soaked in a silicon dioxide precursor in the liquid state;
adding said mineral of the zeolite family soaked in the silicon dioxide precursor to an organic solvent and keeping the solution under agitation;
adding a catalyst to the solution for synthesis of the silicon dioxide;
precipitating a matrix of mineral of the zeolite family comprising silicon dioxide by adding a precipitation agent;
separating and washing the matrix precipitated in the previous operation.

8. The rubber compound according to claim 7, wherein said silicon dioxide precursor is comprised in the group consisting of tetraalkoxysilanes, polysulphur silanes, free mercaptosilanes and blocked mercaptosilanes.

9. The rubber compound according to claim 8, wherein said silicon dioxide precursor is tetraethoxysilane.

10. The rubber compound according to claim 7, wherein said catalyst for synthesis of the silicon dioxide is a basic catalyst.

11. The rubber compound according to claim 7, wherein said silicon dioxide precursor is used in a quantity of between 150 and 350% by weight with respect to said mineral of the zeolite family.

12. A tyre portion, manufactured with a compound according to claim 1.

13. The tyre portion according to claim 12, wherein the tyre portion is a tread.

14. A tyre comprising a portion according to claim 12.

15. A method of making rubber compounds for the production of tyres, comprising the addition of a composite mineral comprising a mineral of the zeolite family, onto which a layer of silicon dioxide has been deposited.

16. The method according to claim 15, wherein said composite mineral is made up of 85 to 95 parts by weight of zeolite and 5 to 15 parts by weight of silicon dioxide.

17. The method according to claim 15, wherein said mineral of the zeolite family has a quantity of empty volume ranging from 15 to 50% of the total volume.

* * * * *